US006957328B2

(12) United States Patent
Goodman et al.

(10) Patent No.: US 6,957,328 B2
(45) Date of Patent: Oct. 18, 2005

(54) SYSTEM AND METHOD USING A FIRST COUNTER AND A SECOND COUNTER TO SELECT A CODE IMAGE DURING A REBOOT ROUTINE

(75) Inventors: Brian Gerard Goodman, Tuscon, AZ (US); Ronald Faye Hill, Jr., Tucson, AZ (US); Leonard George Jesionowski, Tucson, AZ (US); Robin Daniel Roberts, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 647 days.

(21) Appl. No.: 09/755,814

(22) Filed: Jan. 5, 2001

(65) Prior Publication Data

US 2002/0091919 A1 Jul. 11, 2002

(51) Int. Cl.[7] ................................................ G06F 9/00
(52) U.S. Cl. ................................................ 713/2; 713/1
(58) Field of Search ................................ 713/1, 2, 100; 717/168, 169, 170, 173

(56) References Cited

U.S. PATENT DOCUMENTS

| | | | |
|---|---|---|---|
| 5,210,854 A | 5/1993 | Beaverton et al. | |
| 5,297,178 A | 3/1994 | Martin | |
| 5,325,519 A | 6/1994 | Long et al. | |
| 5,450,589 A | 9/1995 | Maebayashi et al. | |
| 5,713,024 A | 1/1998 | Halladay | |
| 5,764,992 A | 6/1998 | Kullick et al. | |
| 5,815,722 A | 9/1998 | Kalwitz et al. | |
| 5,918,048 A | 6/1999 | Mealey et al. | |
| 5,922,072 A | 7/1999 | Hutchinson et al. | |
| 5,949,997 A | * 9/1999 | Smith ........................... 713/2 |
| 5,960,189 A | 9/1999 | Stupek, Jr. et al. | |
| 5,964,873 A | 10/1999 | Choi | |
| 5,974,546 A | 10/1999 | Anderson | |
| 5,987,605 A | 11/1999 | Hill et al. | |
| 6,014,744 A | 1/2000 | McKaughan et al. | |
| 6,035,346 A | 3/2000 | Chieng et al. | |
| 6,275,931 B1 | * 8/2001 | Narayanaswamy et al. .... 713/2 |
| 6,324,692 B1 | * 11/2001 | Fiske .......................... 717/171 |
| 6,584,559 B1 | * 6/2003 | Huh et al. ...................... 713/2 |
| 6,622,246 B1 | * 9/2003 | Biondi ....................... 713/100 |

FOREIGN PATENT DOCUMENTS

JP         08328756 A   * 12/1996   ............. G06F/3/06

OTHER PUBLICATIONS

"System Firmware Update Method before Rebooting the Operating System", Research Disclosure, Sep. 1, 1999, UK.*

U.S. Appl. No. 09/551,844, filed on Apr. 18, 2000, entitled "Redundant Updatable Self–Booting Firmware", invented by Brian Gerard Goodman.

* cited by examiner

Primary Examiner—Lynne H. Browne
Assistant Examiner—Paul Yanchus
(74) Attorney, Agent, or Firm—David W. Victor; Konrad Raynes & Victor, LLP

(57) ABSTRACT

Provided is a method, system, and program for selecting a code image to execute. Multiple copies of a code image are maintained in a non-volatile memory device. A first operation routine is executed. A first counter is incremented if the first operation routine succeeds. A second operation routine is executed and a second counter is incremented if the second operation routine succeeds. The first and second counters are used to select one of the code images from the memory device to execute.

69 Claims, 5 Drawing Sheets

SYSTEM AND METHOD USING A FIRST COUNTER AND A SECOND COUNTER TO SELECT A CODE IMAGE DURING A REBOOT ROUTINE

BACKGROUND OF THE INVENTION

1. Field of the Invention

The present invention relates to a system, method, and program for selecting one of multiple code images in memory to execute following a reboot operation.

2. Description of the Related Art

Embedded systems are microprocessor controlled devices that implement specific functions. For instance, appliances, VCRs, cars, microwaves and other electronic products include an embedded microprocessor. Prior art embedded systems often include a network interface to allow for communication and control over a network such as the Internet. The embedded system microprocessor operates under the control of a firmware program embedded in a non-volatile memory device, such as a read-only memory (ROM) or programmable ROM (PROM), electronically erasable PROM (EEPROM), etc. In the prior art, the firmware may be updated by overwriting the current copy of the firmware with a new version. One problem with such an approach is that even if the update to the firmware succeeds, the newer firmware version may no longer operate properly in the embedded system due to "bugs" or incompatibility issues with the new code. Moreover, the error in the firmware may not be initially detected because the error may arise after the firmware is initialized by the microprocessor when performing device specific functions.

In the prior art, if a newer version of the firmware fails, then an operator or technical repair person must access the embedded system to determine the previous version of the firmware that was fully operational, and then reapply the previous version. Some prior art embedded firmware products require that the product be returned to the manufacturer or service center for repair. Other prior art embedded firmware products can be repaired on-site by a technical person. This approach is problematic because the previous version of the firmware that operated successfully may not be readily available or even ascertainable, especially if there have been numerous versions and updates of the firmware.

Thus, there is a need in the art to provide an improved technique for handling code updates to take into account the possibility that the new version of the firmware may not operate as expected to perform embedded system functions.

SUMMARY OF THE PREFERRED EMBODIMENTS

Preferred embodiments provide a method, system, and program for selecting a code image to execute. Multiple copies of a code image are maintained in a non-volatile memory device. A first operation routine is executed. A first counter is incremented if the first operation routine succeeds. A second operation routine is executed and a second counter is incremented if the second operation routine succeeds. The first and second counters are used to select one of the code images from the memory device to execute.

The operation routine may comprise one of a reboot routine, an initialization routine or a function routine to perform a device specific operation.

In further embodiments, one code image is designated as non-operational if the first counter is a first value and the second counter is a second value. One other code image not designated as non-operational is selected to execute.

If an update to the code image is received, then a determination is made as to whether one code image is designated as non-operational. If so, the code image designated as non-operational is overwritten with the received update to the code image.

Still further, the first operation routine comprises a reboot routine and the second operation routine comprises an initialization routine, and the code images include a function routine to perform an operation after initialization. The function routine in one code image is executed and a third counter associated with the code image including the executed function routine is incremented if the function routine succeeded. The third counter is used, in addition to the first and second counters, to select one of the multiple copies of the code image to from the memory device to execute.

Described implementations provide a technique for maintaining multiple versions of a code image so that if a code image update is not fully operational in the system, then a previous operational version of the code image may be selected for execution. In this way, a fallback code image is maintained to avoid the problem in the art where updates are not fully operational in the system. This is especially problematic when the updated code image comprises the firmware for an embedded system. In such embedded systems, non-operational update versions can completely disable the embedded system. Preferred embodiments avoid disabling the embedded system in the event a non-operational update of the code image is made by providing multiple versions of the code image to use.

Certain of the described implementations provide a technique for determining whether a copy of the code image is "bad" or non-operational so that the deemed "bad" image will not be executed during a reboot operation and so that updates are made to the "bad" image to ensure that at least one code image copy is operational.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
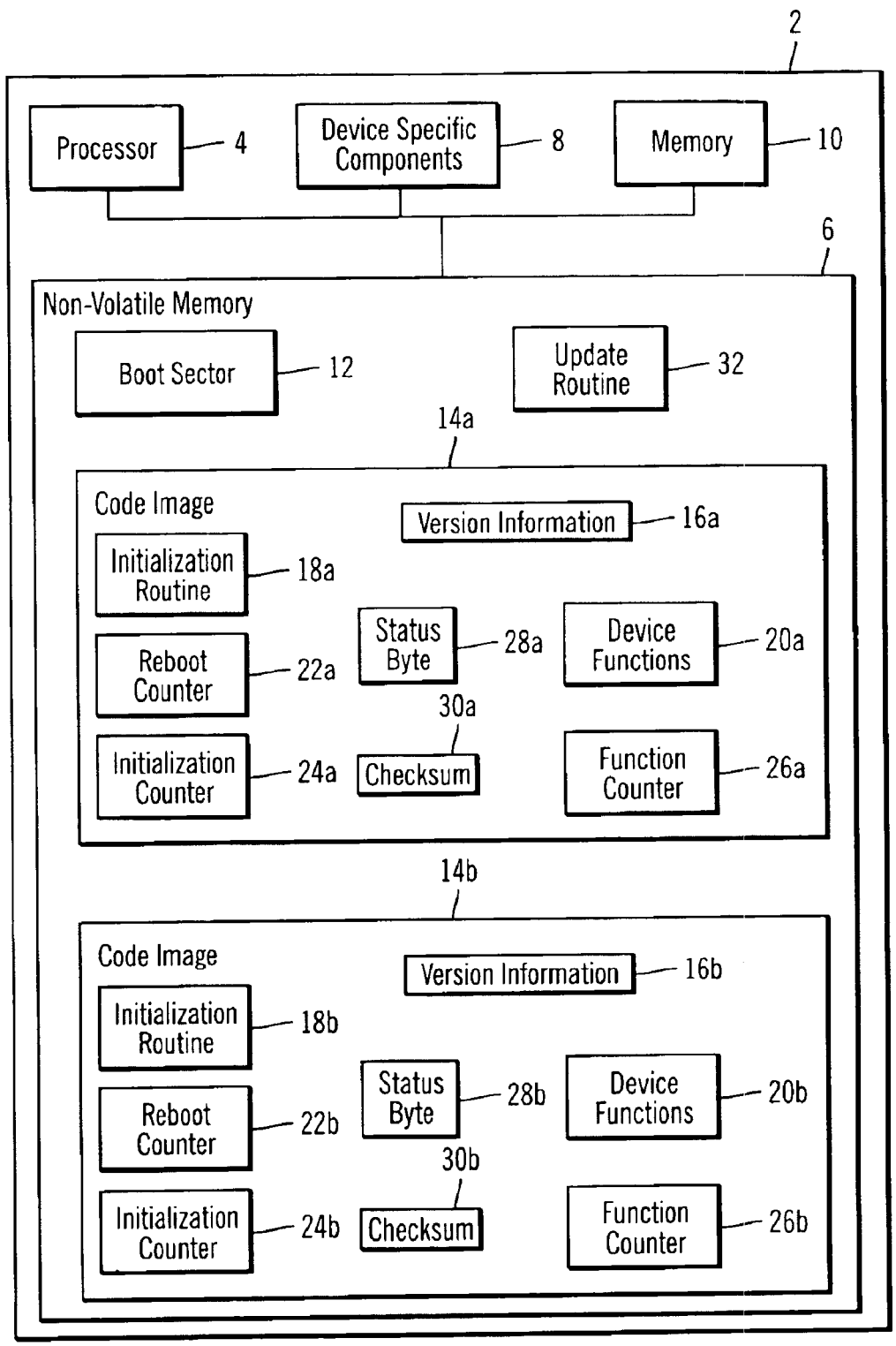
FIG. 1 is a block diagram illustrating a computing environment in which preferred embodiments are implemented.

FIG. 1 illustrates a computing environment in which preferred embodiments are implemented. An embedded system 2 includes a processor 4, a non-volatile memory device 6, device specific components 8, and a memory 10. The processor 4 may comprise any processor or microprocessor device known in the art that operates under program control. The non-volatile memory device 6 may comprise any non-volatile memory device known in the art, such as a PROM, EEPROM, a battery backed-up volatile memory device, magnetic memory device, etc. The device specific components 8 comprise the electronics that operate under processor 4 control to perform the functions and operations of the embedded system 2. The device specific components 8 may comprise servo motors to control electro-mechanical parts or communication ports. The memory 10 preferably comprises a high-speed volatile memory device that the processor 4 uses during operations.

The processor 4 may load programs from the non-volatile memory 6 into the memory 10 to execute and perform the device specific operations. Alternatively, the processor 4 may access instructions from the non-volatile memory 6 and execute the accessed instructions directly from the non-volatile memory 6 without loading the instructions into memory 10 in order to conserve memory 10 resources. In either case, the processor 4 selects instructions from the code image 14a, b to execute. The non-volatile memory 6 includes a boot sector 12 program. During a reboot operation, the processor 4 executes the boot sector 12 to load one code image 14a or 14b into the memory 10. The reboot operation described herein may be performed in response to a power-on event, reset event, or in response to firmware instructions or a remote or local command.

The code images 14a, b include the program code the processor 4 executes to initialize the embedded system 2 and perform device specific operations. In preferred embodiments, the processor 4 maintains at least two versions of the code image 14a, b in the non-volatile memory 6.

Each code image 14a, b includes version information 16a, b that indicates a version number of the code image 14a, b, an initialization routine 18a, b and device functions 20a, b. The initialization routine 18a, b performs an initialization of the code image 14a, b, e.g., initializing variables and parameters used by the code image 14a, b as well as the device specific components 8. After the processor 4 successfully executes the initialization routine 18a, b, the processor 4 is then ready to execute device function 20a, b to control the device specific components 8 to perform device specific operations.

Each code image 14a, b includes three operation counters. A reboot counter that is incremented whenever the embedded system 2 performs a reboot operation, an initialization counter 24a, b indicating the number of times the initialization routine 18a, b has successfully completed and a function counter 26a, b indicating a number of times a device specific operation has successfully been performed. The code images 14a, b further include a status byte 28a, b that indicates whether the respective code image status is "good", which means fully operational at the initialization and device specific operation level, "bad", which means not-fully operational at the initialization or device specific operation level, or "undefined". If the status byte 28a, b indicates that the code image 14a, b has a "good" status, then the code image 14a, b has been successfully initialized and successfully completed device specific operations, whereas a status of "bad" indicates that the code image 14a, b has failed to initialize or complete device specific operations a sufficient number of times such that the code image 14a, b, is deemed bad or inoperable. "Undefined" status indicates that the code image 14a, b status has not yet been determined.

The code images 14a, b further include a checksum value that is used during an error checking operation known in the art, e.g., a checksum algorithm, to determine whether the code image 14a, b has become corrupted.

The non-volatile memory 6 further includes an update routine 32 that is the logic the processor 4 executes to add a new code image update to the non-volatile memory 6 by overwriting one of the current code images 14a, b. Alternatively, the update routine 32 may reside in each of the code images 14a, b.

Following are three embodiments in which the counters 22a, b, 24a, b, 26a, b and status bytes 28a, b may be implemented. In a first embodiment, the counter is implemented in a read/writable non-volatile memory 6 where any particular byte can be changed without affecting other bytes, such as a battery backed-up RAM, parallel electronically erasable programmable read only memories (EEPROMs), magnetic storage device, etc. In the first implementation, the counters 22a, b, 24a, b, 26a, b and status bytes 28a, b may be represented as a binary value in a manner known in the art. In a second embodiment, the counters 22a, b, 24a, b, 26a, b and status bytes 28a, b may be implemented in a flash programmable read only memory (PROM), where a sector or the entire PROM is dedicated to the counters. In the second embodiment, upon determining a new counter value, the processor 4 could erase the a sector or the entire flash PROM, and then re-write the erased data with the modified counter 22a, b, 24a, b, 26a, b or status byte 28a, b values. In a third embodiment, the counters 22a, b, 24a, b, and 26a, b may be implemented within a sector or an entire PROM device, where the sector or entire PROM can be erased to set all bits to "on" or one. To increment the counters 22a, b, 24a, b, and 26a, b, individual bits in the PROM can be changed from one to zero without resetting the entire sector or PROM. In such PROM implementations, different possible number values for the counters 22a, b, 24a, b, 26a, b may correspond to different possible bit arrangements in the PROM that are formed by changing a bit from one to zero without having to erase the sector or entire PROM storing the counter value each time the counter value is adjusted. In PROM implementations, the status byte 28a, b can be one of three different possible values, wherein different bit arrangements in the PROM correspond to one of the different three possible status byte 28a, b values, e.g., "good", "bad", "undefined".

In preferred embodiments, the boot sector 12 uses the status bytes 28a, b to determine which code image 14a, b to select for the processor 4 to use to implement the embedded system 2. The status bytes 28a, b are set by the boot sector 12, the device function 20a, b or other parts of the code image 14a, b using a rule based criteria to determine whether the code image is "bad" or "good" based on the counters 22a, b, 24a, b, 26a, b and status bytes 28a, b. In preferred embodiments, a code image is deemed "good" according to the rule-based criteria if the code image 14a, b has rebooted, initialized and successfully performed functions a threshold number of times thereby indicating that the code image 14a works for its intended purpose. A code image 14a, b is deemed "bad" if the code image is rebooted a sufficient number of times without initializing or initialized a sufficient number of times without successfully performing one or more device specific functions, thereby indicating that the code image 14a, b is not successfully performing initialization or device specific functions.

Figure 2:
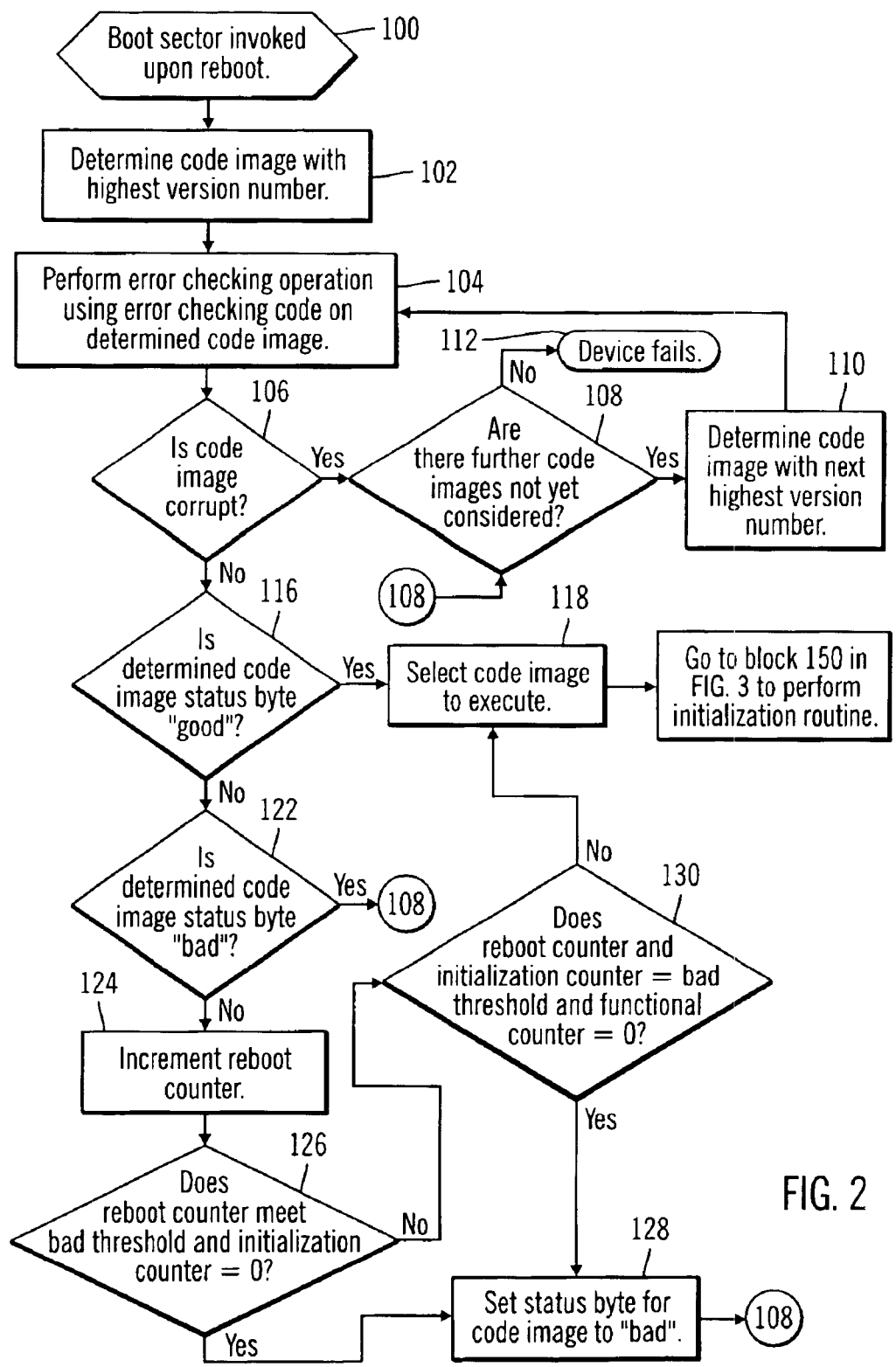
FIGS. 2, 3, and 4 illustrate logic to select a code image to access after a reboot operation in accordance with preferred embodiments of the present invention.
Figure 3:
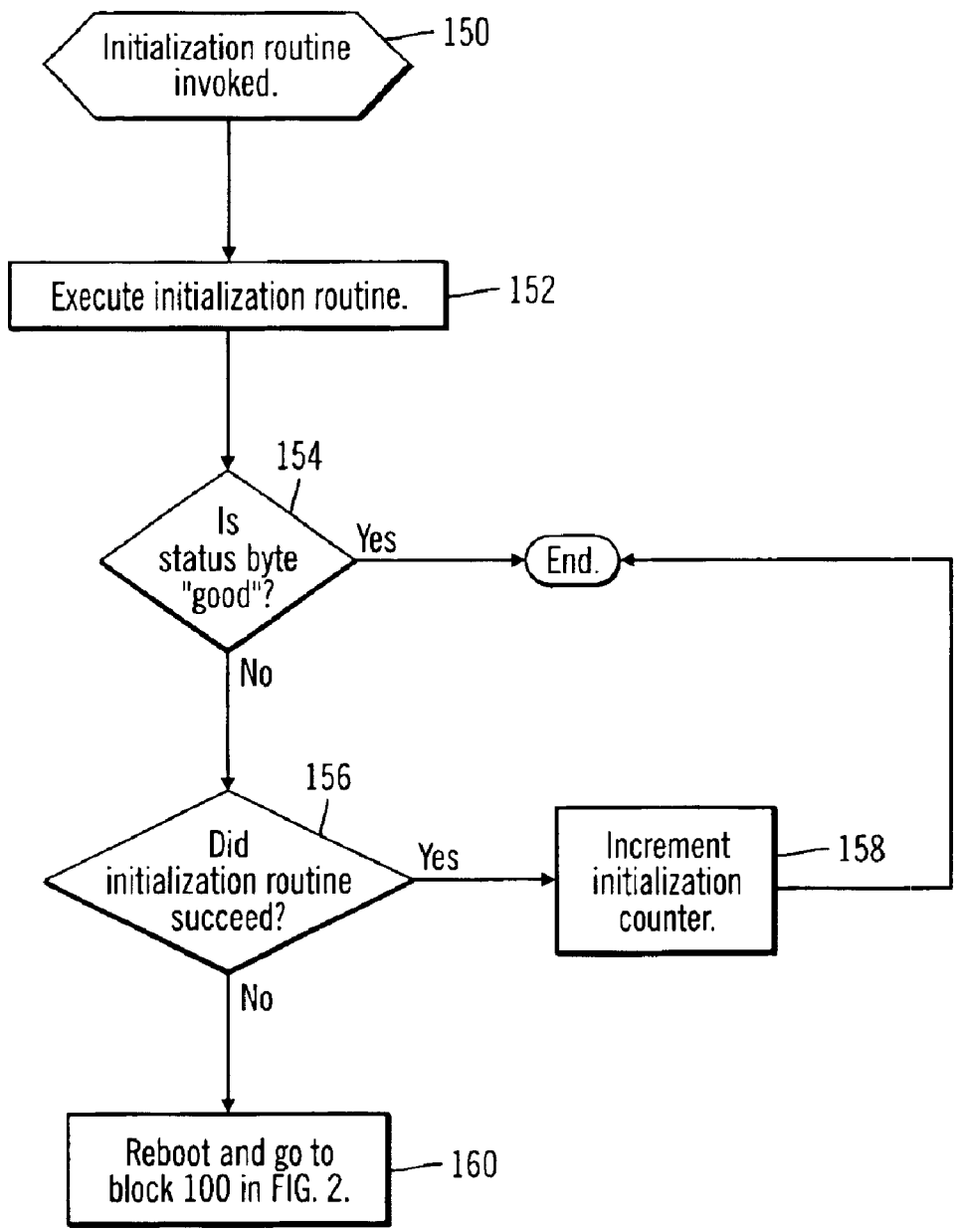
Figure 4:
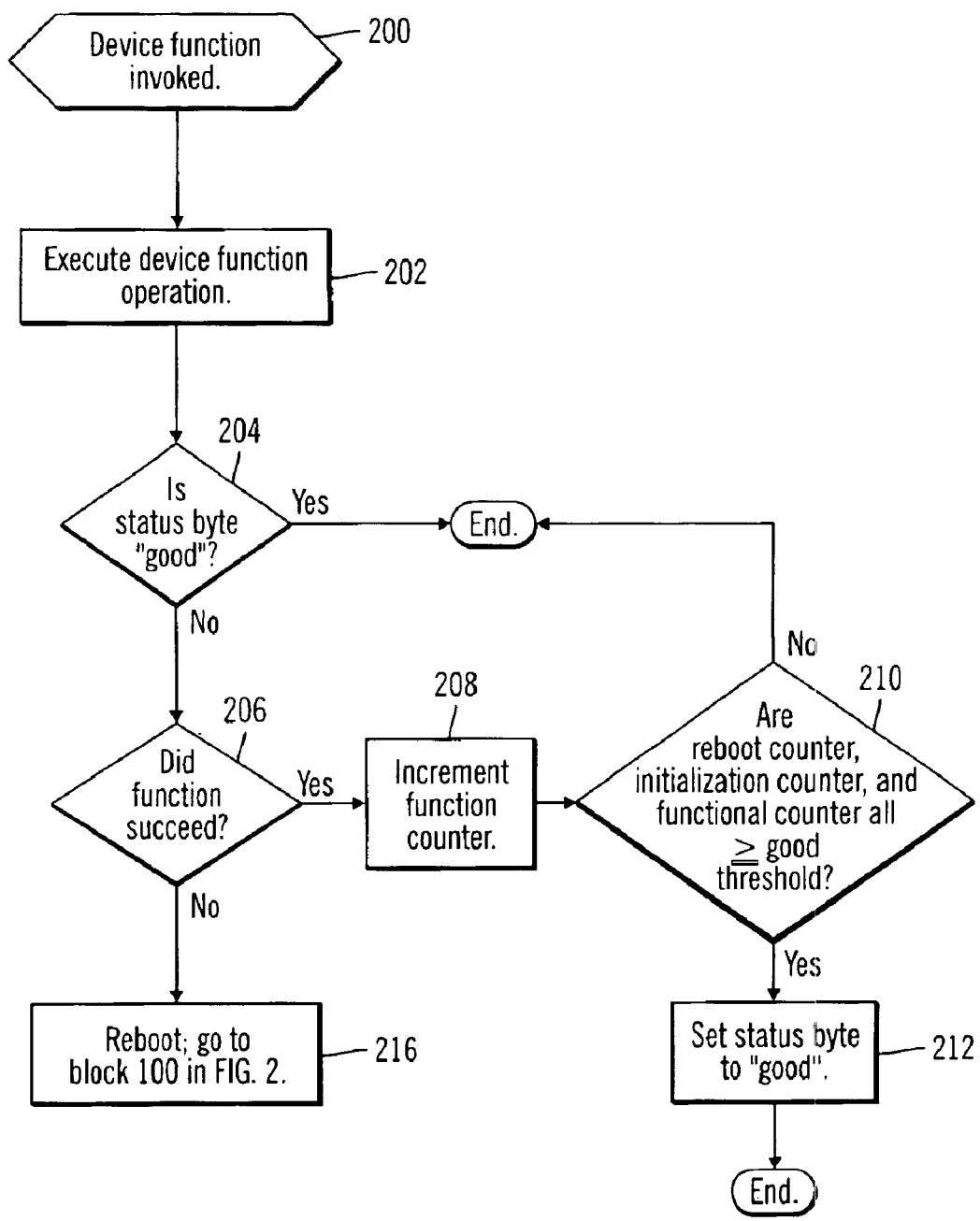

FIGS. 2, 3, and 4 illustrate logic implemented in the boot sector code 12, initialization routine 18a, b, and device functions 20a, b, respectively, that the processor 4 executes to determine which code image 14a, b to load and apply the rule-based criteria to deem an image "good" or "bad". With respect to FIG. 2, control begins at block 100 with the processor 4 executing the boot sector 12 code in response to a reboot operation or reset event. The processor 4 determines (at block 102) the code image 14a, b having the highest version number from the version information 16a, b, i.e., the most recent version of the code image. The processor 4 then performs (at block 104) an error checking operation on the determined code image 14a, b using an error checking algorithm known in the art (e.g., a checksum test algorithm), which may use the error checking code 30a, b maintained with the image code 14a, b, to determine whether the code image 14a, b is corrupt. If (at block 106) the code image 14a, b is corrupt and there are further code images 14a, b not yet checked (at block 108), then the processor 4 determines (at block 110) the code image 14a, b with the next higher version number as indicated in the version information 16a, b. If there are no further code images 14a, b to check then the embedded system 2 would fail (at block 112). After determining a next highest version number code image 14a, b, control proceeds back to block 104 to determine whether that code image 14a, b is corrupt.

If (at block 106) the checked code image 14a, b is not corrupt, then the processor 4 determines (at block 116) whether the determined the code image status byte 28a, b is "good", indicating that the code image 14a, b has been deemed to operate properly. If the status is "good", then the processor 4 selects (at block 118) the code image 14a, b to execute and proceeds to block 150 in FIG. 3 to execute the initialization routine 18a, b. If the code image status byte is not "good" and if (at block 122) the status byte 28a, b is "bad", then control proceeds back to block 108 to check another code image 14a, b if one is available. Otherwise, if the code image 14a, b is undefined, then the processor 4 increments (at block 124) the reboot counter 22a, b indicating that a reboot event has occurred for that code image 14a, b.

After incrementing the reboot counter 22a, b, the processor 4 determines (at block 126) whether the reboot counter 22a, b, equals the bad threshold and the initialization counter 24a, b is zero. If so, then the status byte 28a, b for the code image 14a, b is declared "bad" (at block 128) as the processor 4 has rebooted but not successfully initialized a threshold number of times, which indicates that the code image 14a, b cannot properly initialize. If the condition at block 126 is not met, then the processor 4 determines (at block 130) whether the reboot counter 22a, b and initialization counter 24a, b each equal at least a predetermined "bad threshold" and the functional counter 26a, b is zero. If this is the case, then the embedded system 2 has rebooted and successfully initialized a certain number of times, but not executed the device function code 20a, b to successful completion to perform a device specific operation. After so many times of rebooting and initialization without performing a device specific function, the logic of FIG. 2 sets (at block 128) the status byte for the code image to "bad". Otherwise, if the device specific function has executed, then control proceeds to block 118 to select the code image to execute.

FIG. 3 illustrates logic implemented in the initialization routine 18a, b that the processor 4 executes at block 150 after the reboot of the code image 14a, b is not deemed "bad". At block 152, the processor 4 executes the initialization routine 18a, b to initialize the embedded system 2. If (at block 154) the status byte 28a, b is "good" then control ends with the code image 14a, b initialized and waiting to receive commands to perform device specific operations. If (at block 154) the status byte 28a, b is not "good", then the status byte 28a, b must be "undefined" because the initialization routine 18a, b would not have been called if the status byte 28a, b was "bad" at block 122 of FIG. 2. If (at block 154) the status byte 28a, b is not "good" and the initialization routine succeeded (at block 156), then the processor 4 increments (at block 158) the initialization counter 24a, b and the initialization routine ends with the embedded system 2 initialized and ready to perform device specific functions. If (at block 156) the initialization routine 18a, b did not succeed, then a reboot is initiated (at block 160) and control returns to block 100 in FIG. 2.

FIG. 4 illustrates logic implemented in the device function 20a, b component of the code image 14a, b that is called to perform device specific operations after the embedded system 2 has successfully initialized. The device function 20a, b is invoked at block 200. At block 202, the device function code 20a, b executes. If (at block 204) the status byte 28a, b is "good", then control ends. Otherwise, if (at block 204) the status byte 28a, b is not "good", then the status byte 28a, b must be "undefined" because the device function 20a, b would not have been called if the status byte 28a, b was "bad" at block 122 in FIG. 2. If (at block 204) the status byte 28a, b is not "good" and the device function 20a, b succeeded (at block 206), then the processor 4 increments (at block 208) the function counter 26a, b. If (at block 210) the reboot counter 22a, b, initialization counter 24a, b, and function counter 26a, b are each at least equal to a predetermined "good threshold" number, then the status byte 28a, b is set (at block 212) to "good". In this way, if the embedded system 2 reboots, initializes and successfully performs device specific operations the threshold number of times, then the code image 14a, b is deemed to be good. Otherwise, if the "good threshold" is not met by all counters 22a, b, 24a, b, and 26a, b, then control ends.

If (at block 206) the device function program 20a, b did not successfully execute, then the system reboots (at block 216) and proceeds back to block 100 in FIG. 2 because the device function operation failed. If at blocks 160 or 216 errors prevent a controlled reboot from occurring, then a watchdog timer may cause a reboot on a timeout event.

Thus, the logic of FIGS. 2, 3, and 4 provide an algorithm and counters to implement a rule based system to determine whether a code image is "bad" or "good" based on different combinations of the number of reboot operations, successful initialization operations, and successful completion of device specific operations. In further embodiments, the code images could include additional operation counters for each different discrete device specific operation the embedded system 2 performs. In such case, the code image would not be declared to be "good" until a certain criteria was met, such as all of the operation counters met the "good threshold", thereby indicating that all function programs, as well as the initialization routine, are functioning properly. With the preferred embodiments, if one code image 14a, b fails, then an additional code image may be used.

Figure 5:
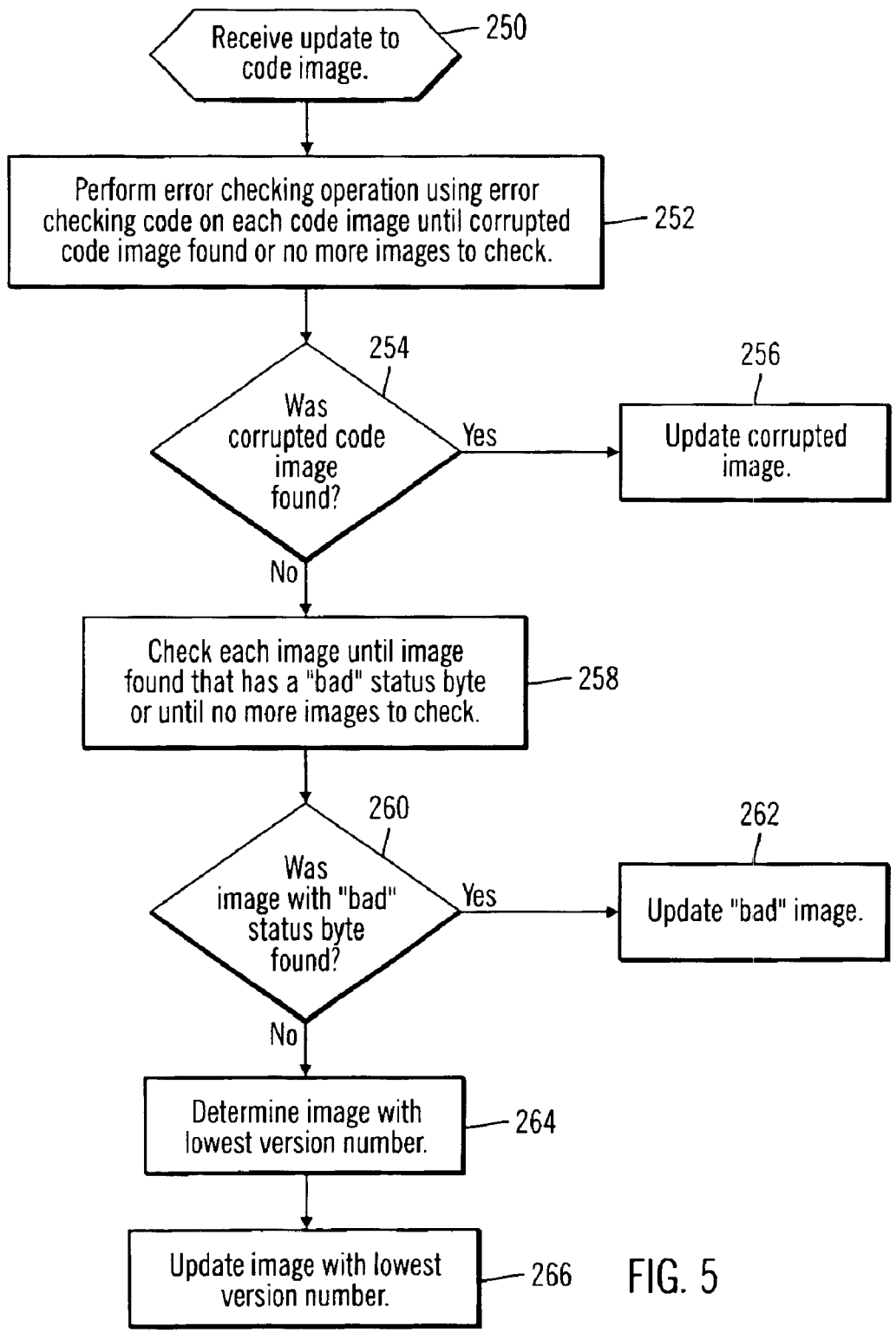
FIG. 5 illustrates logic to update a code image in accordance with preferred embodiments of the present invention.

FIG. 5 illustrates logic implemented in the update routine 32 to apply a code image update. Control begins at block 250 with the system receiving a code image update. The update routine 32 performs (at block 252) an error checking operation using the checksum code 30a, b to check whether each code image 14a, b is corrupted. The update routine 32 checks additional code images if the last checked code image is not corrupt and if there are further code images to check. If (at block 254) a corrupted code image was found, then the update routine updates (at block 256) the corrupted image. Otherwise, if there is no corrupt code image, then the update routine 32 checks (at block 258) each code image 14a, b to determine whether the status byte 28a, b is "bad". The update routine 32 checks additional code images if the last checked code image is not "bad" and if there are further code images to check. If (at block 260) a code image 14a, b having a "bad" status was found, then the update routine 32 updates (at block 262) the "bad" code image 14a, b. Otherwise, if no "bad" image was found, then the update routine 32 determines (at block 264) the code image 14a, b having the lowest version number as indicated in the version information 16a, b fields in the code images 14a, b. The code image 14a, b in the non-volatile memory 6 having the lowest version number is updated (at block 266) with the update code image.

With the logic of FIG. 5, the update routine 32 seeks to maintain at least one valid code image in the non-volatile memory by preferring to update a corrupted or "bad" code image 14a, b. The commonly assigned and co-pending application entitled "Redundant Updateable Self-Booting Firmware", having U.S. application Ser. No. 09/551,844, filed on Apr. 18, 2000, and incorporated herein by reference in its entirety, describes applying updates to firmware to avoid corrupted copies of the code image in the firmware. The preferred embodiments go a step further and update the copy of the code image that is not corrupt and functioning properly (i.e., has a "bad" status). This ensures that there is always a copy of the code image in the non-volatile memory that the boot sector can revert to in the event that one copy of the code images becomes corrupted or a recently updated code image does not function properly with the embedded system. In this way, preferred embodiments provide a methodology for handling the situation where a newer version of the firmware does not function properly. With the preferred embodiments, a prior version of the firmware in the non-volatile memory that does function properly is used.

Following are some alternative implementations for the preferred embodiments.

The preferred embodiments may be implemented as a method, apparatus or program using standard programming and/or engineering techniques to produce software, firmware, hardware, or any combination thereof. The programs and code defining the functions of the preferred embodiment can be delivered to a computer via a variety of information bearing media, which include, but are not limited to, computer-readable devices, firmware, programmable logic, memory devices (e.g., EEPROMs, ROMs, PROMs, RAMs, SRAMs, etc.)"floppy disk," CD-ROM, a file server providing access to the programs via a network transmission line, wireless transmission media, signals propagating through space, radio waves, infrared signals, etc. Still further the code in which the preferred embodiments are implemented may comprise hardware or electronic devices including logic to process data. Of course, those skilled in the art will recognize that many modifications may be made to this configuration without departing from the scope of the present invention.

Preferred embodiments were described with respect to an embedded system where the entire code or firmware for operating the system is maintained in non-volatile memory. In alternative embodiments, the methodology for determining which code image to load may be used with general computer systems, other than an embedded system. In such general computer systems, the rule based system could maintain images of an operating system kernel and use the preferred embodiment algorithms when updating the operating system kernel or determining which of the multiple operating system kernel images to load into memory during a reboot. In still further embodiments, the code images may comprise versions of an application program that a general purpose computer loads into memory. In such case, the computer would use the logic of the preferred embodiments to select one image of the application program to load into memory and execute.

In preferred embodiments, the code images and counters were maintained in a single non-volatile memory device. In alternative embodiments, the code images, routines and counters may be dispersed throughout multiple non-volatile memory and storage devices of different types, e.g., PROMs, hard disk drives, battery backed-up RAM, etc.

In the described implementations, decisions of whether a code image is "good" or "bad" were made when the counters satisfied certain threshold values. In further embodiments, different numbers and thresholds than those described herein could be used as thresholds at blocks 126, 130, and 210 to determine whether a code image should be deemed "good" or "bad". In further embodiments, there may be only two operational routines and counters or more than three operational routines and counters. Additionally, the operational routines may comprise any combination of operations performed by the system, including a reboot routine, initialization routine, device function routine, or a routine for any other type of operation performed by the system. Still further, there may be multiple operation counters to check for the successful completion of different types of functional operations than those described herein at different levels of granularity. For instance, there may be functional counters at a fine grained level checking whether certain subfunctions completed or operations at a higher level.

In further embodiments, once a code image is deemed "good" as a result of the operation counters, then the processor may proceed to update earlier versions of the code image with the code image deemed "good".

The preferred logic of FIGS. 2–5 describe specific operations occurring in a particular order. In alternative embodiments, certain of the logic operations may be performed in a different order, modified or removed and still implement preferred embodiments of the present invention. Morever, steps may be added to the above described logic and still conform to the preferred embodiments.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer implemented method for selecting a code image during a reboot routine, comprising:

maintaining multiple code images in a memory device;

executing a first operation routine;

incrementing a first counter if the first operation routine succeeds;

executing a second operation routine;

incrementing a second counter if the second operation routine succeeds; and using the first and second counters to select one of the code images from the memory device to execute.

2. The method of claim 1, further comprising:
designating one code image as non-operational if the first counter is a first value and the second counter is a second value, wherein one other code image not designated as non-operational is selected to execute.

3. The method of claim 2, wherein the first value is greater than zero and the second value is zero.

4. The method of claim 2, further comprising:
receiving an update to the code image;
determining whether one code image is designated as non-operational; and
overwriting the code image designated as non-operational with the received update to the code image if one code image is designated as non-operational.

5. The method of claim 4, further comprising:
determining an earliest version of the code images in the memory device; and
overwriting the determined earliest version of the code image if one code image is not designated as non-operational.

6. The method of claim 4, further comprising:
determining whether one code image is corrupted; and
if one code image is corrupted, overwriting the corrupted code image with the received update before determining whether one code is non-operational.

7. The method of claim 1, wherein the first operation routine comprises a reboot routine and the second operation routine comprises an initialization routine.

8. The method of claim 7, further comprising:
incrementing the second counter if the initialization routine successfully completed;
rebooting if the initialization routine failed; and
performing another iteration of all previous steps after rebooting.

9. The method of claim 7, further comprising:
selecting one copy of the code image, wherein the executed initialization routine is a component of the selected code image, wherein the selected code image is designated as non-operational if the first counter is the first value and the second counter is the second value; and
selecting one other copy of the code image if the selected code image is designated as non-operational.

10. The method of claim 1, wherein the code image comprise different versions of the code image.

11. The method of claim 1, wherein executing the first and second operation routines, and incrementing the first and second counters are performed during a reboot operation, and wherein the code images include implementations of the first and second counters.

12. The method of claim 11, wherein logic for executing the first and second operation routines, logic for incrementing the first and second counters, logic for using the first and second counters to select one of the code images, and the code images are implemented in firmware that can be updated.

13. The method of claim 7, wherein the initialization routine is included in the code image and is capable of initializing variables and parameters used by the code image.

14. The method of claim 1, wherein the second operation routine is an initialization routine that performs an initialization of the code image by initializing variables and parameters used by the code image.

15. The method of claim 1, wherein the code images include a function routine to perform an operation after initialization, and wherein the function routine is also used to select one of the code images.

16. A computer implemented method for selecting a code image during a reboot, comprising:
maintaining multiple code images in a memory device, wherein the code images include a function routine to perform an operation after initialization;
executing a reboot routine and incrementing a first counter if the reboot routine succeeds;
executing an initialization routine and incrementing a second counter if the second operation routine succeeds;
executing the function routine in one code image and incrementing a third counter associated with the one code image including the executed function routine if the function routine succeeds; and
using the first, second, and third counters to select one of the multiple code images from the memory device to execute.

17. The method of claim 16, further comprising:
designating one code image as operational if the first, second, and third counters satisfy at least one threshold value, wherein the code image designated as operational is automatically selected from the memory device to execute after subsequent reboot operations.

18. The method of claim 16, further comprising:
designating one code image non-operational if the first, second, and third counters satisfy at least one threshold value, wherein one other code image not designated as non-operational is selected from the memory device and executed.

19. The method of claim 18, wherein the threshold value for the third counter is zero and wherein the at least one threshold value for the first and second counters is greater than zero.

20. The method of claim 18, further comprising:
incrementing the second counter if the initialization routine successfully completed;
rebooting if the initialization or function routine failed; and
performing another iteration of all previous steps after rebooting.

21. The method of claim 16, wherein the code image includes multiple function routines, wherein there is one counter for each of the multiple function routines, and further comprising:
designating one code image as operational if the first counter, second counter, and each counter associated with a function routine satisfy at least one threshold value, wherein the code image designated as operational is automatically selected from the memory device to execute after subsequent reboot operations.

22. The method of claim 1, wherein one operation routine comprises a function routine to perform a device specific operation.

23. The method of claim 16, wherein the code images include implementations of the first, second, and third counters, and wherein the code images include implementations of the reboot routine, the initialization routine, and the function routine.

24. A computer system for selecting a code image during a reboot routine, comprising:
a processor, a memory device maintaining multiple code images, wherein the processor is capable of accessing the memory device;

program logic executed by the processor, wherein the program logic causes the processor to perform:
(i) executing a first operation routine;
(ii) incrementing a first counter if the first operation routine succeeds;
executing a second operation routine;
(iii) incrementing a second counter if the second operation routine succeeds; and
(iv) using the first and second counters to select one of the code images from the memory device to execute.

25. The system of claim 24, wherein the program logic is further capable of causing the processor to perform:
designating one code image as non-operational if the first counter is a first value and the second counter is a second value, wherein one other code image not designated as non-operational is selected to execute.

26. The system of claim 25, wherein the first value is greater than zero and the second value is zero.

27. The system of claim 25, wherein the program logic is further capable of causing the processor to perform:
receiving an update to the code image;
determining whether one code image is designated as non-operational; and
overwriting the code image designated as non-operational with the received update to the code image if one code image is designated as non-operational.

28. The system of claim 27, wherein the program logic is further capable of causing the processor to perform:
determining an earliest version of the code images in the memory device; and
overwriting the determined earliest version of the code image if one code image is not designated as non-operational.

29. The system of claim 27, wherein the program logic is further capable of causing the processor to perform:
determining whether one code image is corrupted; and
if one code image is corrupted, overwriting the corrupted code image with the received update before determining whether one code is non-operational.

30. The system claim 24, wherein the first operation routine comprises a reboot routine and the second operation routine comprises an initialization routine.

31. The system of claim 30, wherein the program logic is further capable of causing the processor to perform:
incrementing the second counter if the initialization routine successfully completed;
rebooting if the initialization routine failed; and
performing another iteration of all previous steps after rebooting.

32. The system of claim 30, wherein the program logic is further capable of causing the processor to perform.:
selecting one copy of the code image, wherein the executed initialization routine is a component of the selected code image, wherein the selected code image is designated as non-operational if the first counter is the first value and the second counter is the second value; and
selecting one other copy of the code image if the selected code image is designated as non-operational.

33. The system of claim 24, wherein the code image comprise different versions of the code image.

34. The system of claim 24, wherein executing the first and second operation routines, and incrementing the first and second counters are performed during a reboot operation, and wherein the code images include implementations of the first and second counters.

35. The system of claim 34, wherein logic for executing the first and second operation routines, logic for incrementing the first and second counters, logic for using the first and second counters to select one of the code images, and the code images are implemented in firm ware that can be updated.

36. The system of claim 30, wherein the initialization routine is included in the code image and is capable of initializing variables and parameters used by the code image.

37. The system of claim 24, wherein the second operation routine is an initialization routine that performs initialization of the code image by initializing variables and parameters used by the code image.

38. The system of claim 24, wherein the code images include a function routine to perform an operation after initialization, and wherein the function routine is also used to select one of the code images.

39. A computer system for selecting a code image during a reboot, comprising:
a processor;
a memory device maintaining multiple code images, wherein the processor is capable of accessing the memory device, and wherein the code images include a function routine to perform an operation alter initialization;
program logic executed by the processor, wherein the program logic cause, the processor to perform:
(i) executing a reboot routine and incrementing a first counter if the reboot routine succeeds;
(ii) executing an initialization routine and incrementing a second counter if the initialization routine succeeds; and
(iii) executing the function routine in one code image and incrementing a third counter associated with the code image including the executed function routine if the function routine succeeds; and
(iv) using the first, second and third counters to select one of the code images from the memory device to execute.

40. The system of claim 39, wherein the program logic is further capable of causing the processor to perform:
designating one code image as operational if the first, second, and third counters satisfy at least one threshold value, wherein the code image designated as operational is automatically selected from the memory device to execute after subsequent reboot operations.

41. The system of claim 39, wherein the program logic is further capable of causing the processor to perform:
designating one code image as non-operational if the first, second, and third counters satisfy at least one threshold value, wherein one other code image not designated as non-operational is selected from the memory device and executed.

42. The system of claim 41, wherein the threshold value for the third counter is zero and wherein the at least one threshold value for the first and second counters is greater than zero.

43. The system of claim 41, wherein the program logic is further capable of causing the processor to perform:
incrementing the second counter if the initialization routine successfully completed;

rebooting if the initialization or function routine failed; and performing another iteration of all previous steps after rebooting.

44. The system of claim 39, wherein the code image includes multiple function routines, wherein there is one counter for each of the multiple function routines, and further comprising:

designating one code image as operational if the first counter, second counter, and each counter associated with a function routine satisfy at least one threshold value, wherein the code image designated as operational is automatically selected from the memory device to execute after subsequent reboot operations.

45. The system of claim 24, wherein one operation routine comprises a function routine to perform a device specific operation.

46. The system of claim 39, wherein the code images include implementations of the first, second, and third counters, and wherein the code images include implementations of the reboot routine, the initialization routine, and the function routine.

47. An article of manufacture for selecting a code image during a reboot routine, wherein the article of manufacture includes code in a computer readable medium capable of causing a processor to perform:

maintaining multiple code images;

executing a first operation routine;

incrementing a first counter if the first operation routine succeeds;

executing a second operation routine;

incrementing a second counter if the second operation routine succeeds; and using the first and second counters to select one of the code images to execute.

48. The article of manufacture of claim 47, wherein the article of manufacture code is further capable of causing the processor to perform:

designating one code image as non-operational if the first counter is a first value and the second counter is a second value, wherein one other code image not designated as non-operational is selected to execute.

49. The article of manufacture of claim 48, wherein the first value is greater than zero and the second value is zero.

50. The article of manufacture of claim 48, wherein the article of manufacture code is further capable of causing the processor to perform:

receiving an update to the code image;

determining whether one code image is designated as non-operational; and overwriting the code image designated as non-operational with the received update to the code image if one code image is designated as non-operational.

51. The article of manufacture of claim 50, wherein the article of manufacture code is further capable of causing the processor to perform:

determining an earliest version of the coda images; and overwriting the determined earliest version of the code image if one code image is not designated as non-operational.

52. The article of manufacture of claim 50, wherein the article of manufacture code is further capable of causing the processor to perform:

determining whether one code image is corrupted; and if one code image is corrupted, overwriting the corrupted code image with the received update before determining whether one code is non-operational.

53. The article of manufacture of claim 47, wherein the first operation routine comprises a reboot routine and the second operation routine comprises an initialization routine.

54. The article of manufacture of claim 53, wherein the article of manufacture code is further capable of causing the processor to perform:

incrementing the second counter if the initialization routine successfully completed;

rebooting if the initialization routine failed; and performing another iteration of all previous steps after rebooting.

55. The article of manufacture of claim 53, wherein the article of manufacture code is further capable of causing the processor to perform:

selecting one copy of the code image, wherein the executed initialization routine is a component of the selected code image wherein the selected code image is designated as non-operational if the first counter is the first value and the second counter is the second value; and selecting one other copy of the code image if the selected code image is designated as non-operational.

56. The article of manufacture of claim 47, wherein the code image comprise different versions of the code image.

57. The article of manufacture of claim 47, wherein one operation routine comprises a function routine to perform a device specific operation.

58. The article of manufacture of claim 47, wherein executing the first and second operation routines, and incrementing the first and second counters are performed during a reboot operation, and wherein the code images include implementations of the first and second counters.

59. The article of manufacture of claim 58, wherein logic for executing the first and second operation routines, logic for incrementing the first and second counters, logic for using the first and second counters to select one of the code images, and the code images are implemented in firmware that can be updated.

60. The article of manufacture of claim 53, wherein the initialization routine is included in the code image and is capable of initializing variables and parameters used by the code image.

61. The article of manufacture of clam 47, wherein the second operation routine is an initialization routine that performs an initialization of the code image by initializing variables and parameters used by the code image.

62. The article of manufacture of claim 47, wherein the code images include a function routine to perform an operation after initialization, and wherein the function routine is also used to select one of the code images.

63. An article of manufacture for selecting a code image during a reboot, wherein the article of manufacture includes code in a computer readable medium capable of causing a processor to perform:

maintaining multiple code images, wherein the code images include a function routine to perform an operation after initialization;

executing a reboot routine and incrementing a first counter if the reboot routine succeeds;

executing an initialization routine and incrementing a second counter if the initialization routine succeeds;

executing the function routine in one code image and incrementing a third counter associated with the code image including the executed function routine if the function routine succeeds; and using the first, second and third counters to select one of the code images to execute.

64. The article of manufacture of claim 63, wherein the article of manufacture code is further capable of causing the processor to perform:

designating one code image as operational if the first, second, and third counters satisfy at least one threshold value, wherein the code image designated as operational is automatically selected to execute after subsequent reboot operations.

65. The article of manufacture of claim 63, wherein the article of manufacture code is further capable of causing the processor to perform:

designating one code image as non-operational if the first, second, and third counters satisfy at least one threshold value, wherein one other code image not designated as non-operational is selected and executed.

66. The article of manufacture of claim 65, wherein the threshold value for the third counter is zero and wherein the at least one threshold value for the first and second counters is greater than zero.

67. The article of manufacture of claim 65, wherein the article of manufacture code is further capable of causing the processor to perform:

incrementing the second counter if the initialization routine successfully completed;

rebooting if the initialization or function routine failed; and performing another iteration of all previous steps after rebooting.

68. The article of manufacture of claim 63, wherein the code image includes multiple function routines, wherein there is one counter for each of the multiple function routines, wherein the article of manufacture code is further capable of causing the processor to perform:

designating one code image as operational if the first counter, second counter, and each counter associated with a function routine satisfy at least one threshold value, wherein the code image designated as operational is automatically selected to execute after subsequent reboot operations.

69. The article of manufacture of claim 63, wherein the code images include implementations of the first, second, and third counters, and wherein the code images include implementations of the reboot routine, the initialization routine, and the function routine.

* * * * *